(12) United States Patent
Sukhanov et al.

(10) Patent No.: US 9,792,665 B2
(45) Date of Patent: Oct. 17, 2017

(54) REAL TIME VISUAL FEEDBACK DURING MOVE, RESIZE AND/OR ROTATE ACTIONS IN AN ELECTRONIC DOCUMENT

(71) Applicant: MICROSOFT TECHNOLOGY LICENSING, LLC, Redmond, WA (US)

(72) Inventors: Anton Sukhanov, Bellevue, WA (US); Theresa Ann Estrada, Duvall, WA (US); Nupur Agarwal, Redmond, WA (US); Manuel David Ruiz, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/980,810

(22) Filed: Dec. 28, 2015

(65) Prior Publication Data
US 2016/0132989 A1    May 12, 2016

Related U.S. Application Data

(63) Continuation of application No. 13/560,325, filed on Jul. 27, 2012, now Pat. No. 9,223,761.
(Continued)

(51) Int. Cl.
*G06F 13/12*   (2006.01)
*G06T 3/00*    (2006.01)
(Continued)

(52) U.S. Cl.
CPC .......... *G06T 3/0006* (2013.01); *G06F 3/0488* (2013.01); *G06F 3/04847* (2013.01); *G06F 17/212* (2013.01)

(58) Field of Classification Search
CPC ............................ G06F 3/0481; G06F 3/0484
(Continued)

(56) References Cited

U.S. PATENT DOCUMENTS 5,844,547 A * 12/1998 Minakuchi ............ G06F 3/0481
                                                         345/156
6,160,551 A * 12/2000 Naughton ............. G06F 3/0481
                                                         348/E5.102
(Continued)

OTHER PUBLICATIONS

Maloney, John, "An Introduction to Morphic: The Squeak User Interface Framework", In Squeak: Open Personal Computing and Multimedia, Prentice Hall, ch. 2, 2002, (pp. 39-68), 38 pages.
(Continued)

*Primary Examiner* — Titus Wong
(74) *Attorney, Agent, or Firm* — Merchant & Gould; Steven F. Owens

(57) ABSTRACT

Real time feedback during move, resize or rotate actions in an electronic document is provided. During live drag actions, the layout shown during the action may be the layout produced when the object is dropped. Detection of slow performance of an application and aborting a redraw action as needed may be provided. A visual indication may be provided for helping users to see that an action is in progress, and thereby removing a perception that the application is failing to respond properly. Determining if a figure will not land in a current cursor/touch point position in a move action and a visual indication to help the user see where and why the figure may jump to a new location may also be provided. In addition, determining an attachment point for an object on a page comprising a table may also be provided.

19 Claims, 14 Drawing Sheets

Related U.S. Application Data

(60) Provisional application No. 61/555,633, filed on Nov. 4, 2011.

(51) Int. Cl.
   *G06F 17/21* (2006.01)
   *G06F 3/0488* (2013.01)
   *G06F 3/0484* (2013.01)

(58) Field of Classification Search
   USPC .......................................................... 710/62
   See application file for complete search history.

(56) References Cited

U.S. PATENT DOCUMENTS

| | | |
|---|---|---|
| 6,714,219 B2 | 3/2004 | Lindhorst et al. |
| 6,750,887 B1 | 6/2004 | Kellerman et al. |
| 6,826,727 B1 | 11/2004 | Mohr et al. |
| 7,249,327 B2 * | 7/2007 | Nelson ................. G06F 3/0483 345/419 |
| 7,554,689 B2 | 6/2009 | Tonisson |
| 9,223,761 B2 | 12/2015 | Sukhanov et al. |
| 2004/0003350 A1 * | 1/2004 | Simmons .............. G06F 17/211 715/244 |
| 2008/0313533 A1 | 12/2008 | Hoyer et al. |
| 2009/0006946 A1 | 1/2009 | Hanson et al. |
| 2010/0153888 A1 | 6/2010 | Jarosz |
| 2011/0179350 A1 | 7/2011 | Capela et al. |
| 2011/0209099 A1 * | 8/2011 | Hinckley ............. G06F 3/0483 715/863 |
| 2011/0291964 A1 * | 12/2011 | Chambers ............. G06F 1/1616 345/173 |

OTHER PUBLICATIONS

U.S. Appl. 13/560,325 Notice of Allowance dated Aug. 21, 2015, 8 Pages.

\* cited by examiner

REAL TIME VISUAL FEEDBACK DURING MOVE, RESIZE AND/OR ROTATE ACTIONS IN AN ELECTRONIC DOCUMENT

CROSS-REFERENCE TO RELATED APPLICATIONS

This application is a continuation of U.S. patent application Ser. No. 13/560,325 filed Jul. 27, 2012 and assigned U.S. Pat. No. 9,223,761, which claims priority to U.S. Provisional Patent Application No. 61/555,633 filed Nov. 4, 2011, the disclosures of which are hereby incorporated by reference in their entirety.

BACKGROUND

Various application programs may be provided for authoring documents. Oftentimes when authoring a document, a user may insert a figure or object into his/her document (e.g., picture, shape, chart, word art, etc.) Once a figure has been inserted into a document, the user may want to reposition or resize or rotate the object on the page. With current systems, users may have this ability, but may not be able to reposition, resize, or rotate an object in a way that gives him/her a real time understanding of how the document may be displayed once the action is completed.

In current systems, when a layout and display of a document is updated in real time during a move, resize, or rotate action of an object, various problems may be experienced, such as: performance of the action may be slow enough that it causes an appearance of an application hang; the layout may change such that the object may unexpectedly move or jump to another page of the document, possibly without a user understanding where the object landed and why; and interactions between objects and tables may appear to have unpredictable results. For example, a user may drag an object on a page. If the object is dragged into a table, the object may be placed in the table. Accordingly, this may cause the table to jump off the current page onto another page if there is not enough space on the current page for the table with the object placed inside. The table may appear to randomly jump off a page. As can be appreciated, interaction between objects and tables may be confusing and frustrating for a user as the layout is being constantly updated.

Move, resize, and rotate actions may oftentimes result in a frustrating trial and error process to achieve the desired layout. It is with respect to these and other considerations that the present invention has been made.

SUMMARY

Embodiments of the present invention solve the above and other problems by providing real-time feedback as a move, resize, or rotate action is being performed. According to one embodiment, performance of a live resize or rotate action may be measured. If it is determined that performance of the live resize or rotate action exceeds a predetermined threshold (is too slow), a bounding box of the object may be displayed and may stay with a user's cursor or touch point throughout the action to ensure the user receives feedback that a resize or rotate action is being performed.

According to another embodiment, if during a move, resize, or rotate action of an object the updated layout causes the object to move to a new page, a semi-transparent version of the object may be displayed on the current page and may provide an indication that the object will not be positioned on the current page when the action is completed.

According to another embodiment, when an object on a page comprising a table is moved, a mechanism may be provided for determining an attachment point for the object. For example, a determination may be made whether the object may be moved into the table or between cells of the table.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 2 is an illustration of a an example screenshot of providing visual feedback of a resize or rotate action during slow application performance;

FIG. 3 is an illustration of an example screenshot after a resize action of an object;

DETAILED DESCRIPTION

Figure 1:
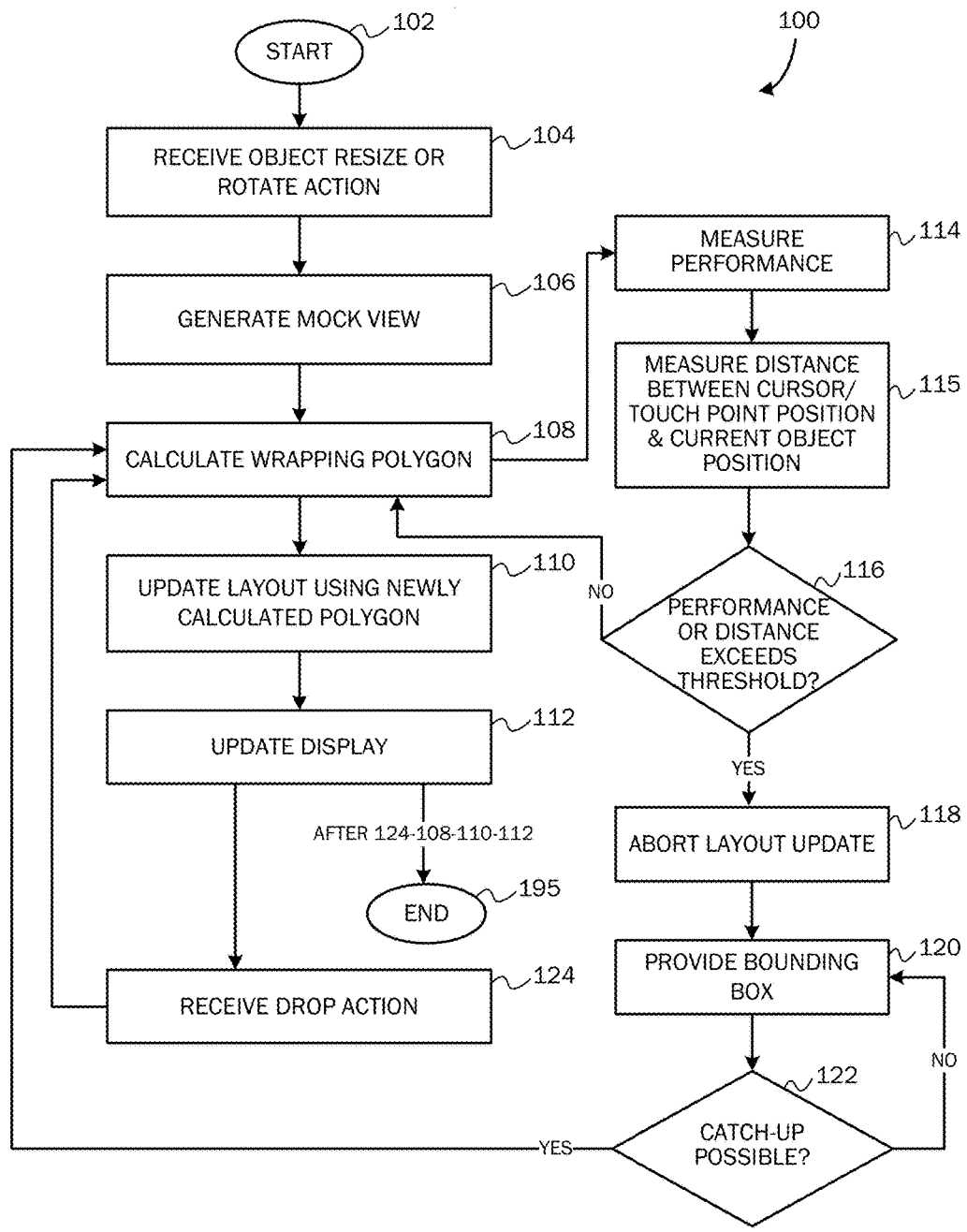
FIG. 1 is a flow chart of a method for providing visual feedback of a resize or rotate action during slow application performance according to an embodiment.

As briefly described above, embodiments of the present invention are directed to providing real-time feedback as a move, resize, or rotate action is being performed.

A live drag action, for example, during a move, resize or rotate action, may help a user position an object on a page correctly by allowing the user to see the results of layout updating in real time. The layout shown on a page during a move, resize, or rotate action may be the layout that will be produced when the object is dropped. A document layout may be recalculated for each input device event (e.g., mouse event, touch event, gesture event, etc.) received during a move, resize or rotate action. As the layout is recalculated, text and other content on a page may reflow to accommodate the new position or size of the object.

At times, performance may not be ideal. That is, a frame rate of a redraw of the object may be slow and the user may not receive feedback that a live action has been started or is in progress. Embodiments may provide a mechanism for detecting slow performance of an application and for aborting a redraw action as needed. Additionally, a visual indication may be provided for helping users to see that a resize or rotate action is in progress, and thereby removing a perception that the application is hanging (e.g., performing slowly or exhibiting a delay in performance). Embodiments may also provide for determining if an object will not land in a current mouse cursor position (or touch point) in a move action and a visual indication to help the user see where and why the object will jump to a new location. Embodiments may also provide for determining an attachment point for an object.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As described above, with current systems, when an object is selected and resized or rotated, a shadow or outline may be displayed indicating the position, size, or angle of the object once the action is committed. Embodiments provide for a real-time visualization of a document as an object is being resized or rotated. The layout shown in the real-time visualization is the layout that may be produced when the object is dropped (action is committed). The document layout may be recalculated when an input device event is received during an object resize, rotate, or move. As the layout is recalculated, text and other content on page may reflow to accommodate the new size and/or position of the object. As an object is live-dragged, a full-fidelity visualization of the object may be displayed. That is, effects, such as borders, shadows, glows, two-dimensional rotation, and three-dimensional rotation may be applied. Effects and rotation may change a wrapping polygon of an object and consequently impact the layout. The wrapping polygon is a polygon drawn around an object for determining how text may wrap around the object.

According to embodiments and as described briefly above, for each mouse event, touch event or gesture event received during a move, resize, or rotate action of an object, the document layout may be recalculated. As the layout is recalculated, text and other content on a page may reflow to accommodate the new position or size of the object. In cases when a live drag may perform poorly such that the object may appear to jump around on a screen or an application may appear to hang, embodiments provide for detecting poor object resize or rotation performance. A visual indication may be provided, helping users to see as much of the live drag action as possible and thereby helping to remove a perception that the application is hanging.

Figure 2:
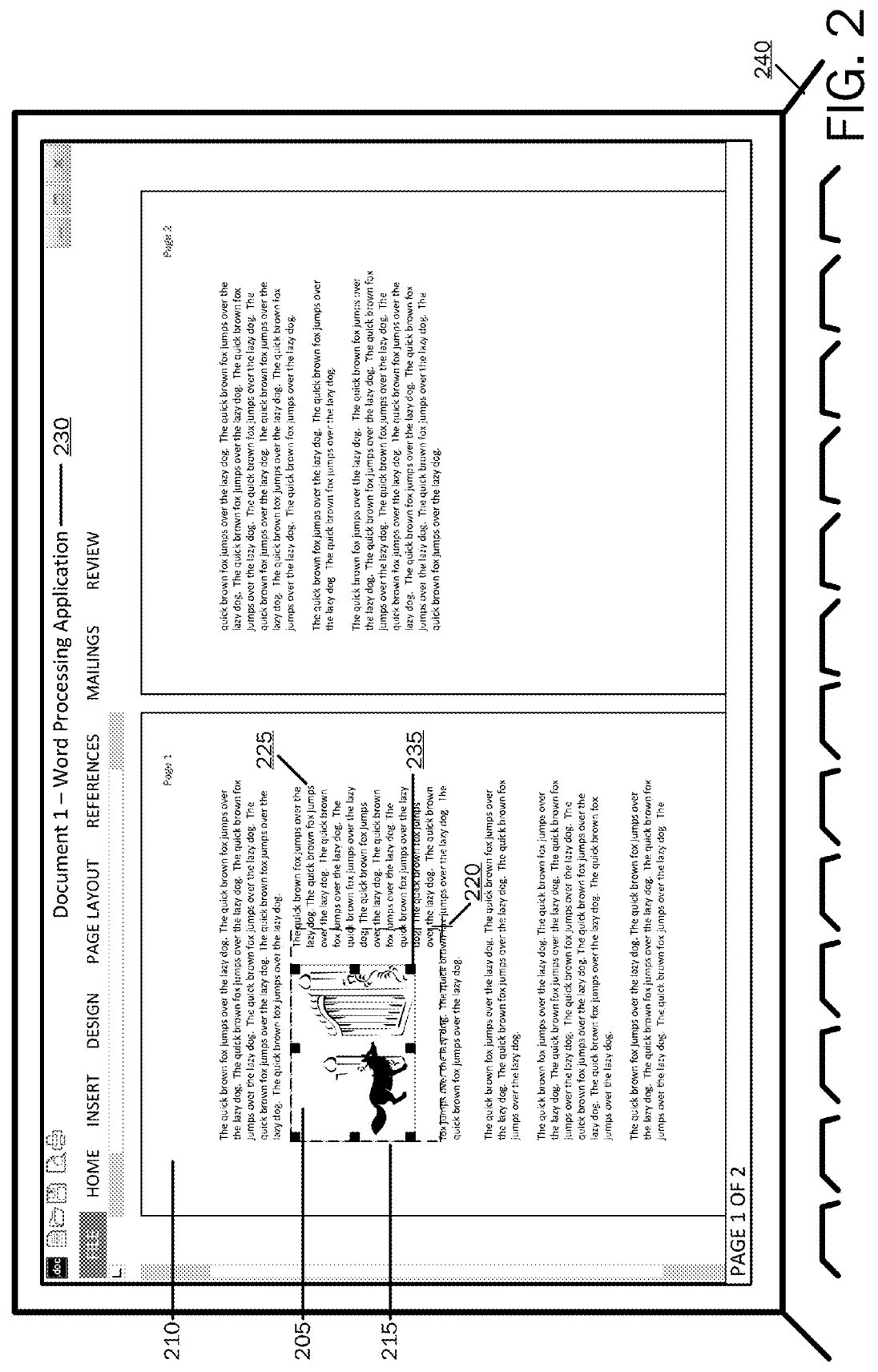

Referring now to the drawings, in which like numerals represent like elements, various embodiments will be described. FIG. 1 is a flow chart of a method 100 for providing live drag performance fallback according to an embodiment. For purposes of illustration, the process flow of method 100 will be described with reference to FIGS. 2-3. The method 100 starts at OPERATION 102 and proceeds to OPERATION 104 where input associated with a resize or rotate action for an object is received, wherein the object may include one of various types of objects including, but not limited to, a picture, clip art, a shape, SmartArt®, a chart, a screenshot, word art, a text box, etc. For example and as illustrated in FIG. 2, a user may compose or edit a document 210, such as a word processing document, using an application 230, such as a word processing application. In the example illustrated, the document 210 is shown displayed on a screen of a laptop computing device 240. As should be appreciated, a laptop computing device 240 is just one of various types of computing devices with which embodiments of the present invention may be practiced. As shown, the document 210 may contain various content items, for example, the document 210 may contain text 225 and clip art (object 205). As illustrated in FIG. 2, a user has selected a handle of the object 205 to perform a resize action.

A resize or rotate action may be initiated via various methods. For example, a user may select a selection handle 235 on an object 205 and drag the handle inwardly into the object 205 to resize the object to a smaller size or outwardly away from the object 205 to resize the object to a larger size. A rotate action may be initiated, for example, by selecting a rotation handle 235 located on an object 205. As another example, touch or gesture input may be utilized when using a computing device comprising touch or gesture functionalities.

Referring back to FIG. 1, the method 100 proceeds to OPERATION 106 where a mock view of the document 210 may be generated. According to embodiments, the mock view may not be displayed to a user. The mock view of the document 210 may include a wrapping polygon drawn around an object 205 to determine how text 225 may be wrapped around the object 205.

The method 100 proceeds to OPERATION 108 where the wrapping polygon in the mock view is calculated. When an object 205 is resized or rotated, its wrapping polygon changes. The wrapping polygon may thus be recalculated, causing the object 205 to be redrawn. When updating layout in real-time during a resize or rotate action, the recalculation may be performed repeatedly as the position of the user's cursor/touch point 220 moves. According to embodiments, by calculating the wrapping polygon in the mock view, the display may not be impacted if performance is slow.

At OPERATION 110, the layout may be updated. The object 205 may be re-anchored using the newly-calculated wrapping polygon. At OPERATION 112, the display may be updated with the results of the calculation and the updated layout. For example, if the action is a resize action, the object 205 may grow or shrink in size according to the user's cursor 220 position or multi-touch expansion, and the text 225 in the document 210 may be updated to wrap around the object 205 as it would when the action is committed.

OPERATION 114 may occur concurrently with OPERATIONS 108, 110 and 112. At OPERATION 114, for each redraw, the time it takes to calculate the wrapping polygon in OPERATION 108 may be measured. OPERATION 115 may occur concurrently with OPERATION 114. At OPERA- TION 115, the distance between the user's cursor/touch point 220 position and a current position of the object 205 may be measured.

The method 100 proceeds to DECISION OPERATION 116 where a determination is made whether the time to calculate the wrapping polygon or the distance between the user's cursor/touch point 220 position and the current position of the object 205 exceeds a predetermined threshold. For example, a frame rate to update a screen to ensure an action appears smooth to the naked eye may be at a rate of 30 frames per second (FPS). A point at which a lag or choppiness may be perceived may be between 1-5 FPS. According to one example, the predetermined threshold may be 4 FPS or 250 milliseconds. According to embodiments, the predetermined threshold may be set at a level determined to provide a positive user experience and may be adjusted to refine a balance between layout accuracy and performance.

If at DECISION OPERATION 116 a determination is made that neither the time to calculate the wrapping polygon nor the distance between the user's cursor/touch point 220 position and the current position of the object 205 exceeds the predetermined threshold, the method 100 may proceed with OPERATIONS 110 and 112. However, if at DECISION OPERATION 116 a determination is made that either the time to calculate the wrapping polygon or the distance between the user's cursor/touch point 220 position and the current position of the object 205 exceeds the predetermined threshold, the method 100 may proceed to OPERATION 118 where the layout and display updates (110-112) may be aborted. Accordingly, when the layout and display updates are aborted, there may not be an appearance of a hang while the user is waiting for the redraw to complete.

The method 100 proceeds to OPERATION 120 where a bounding box 215 (illustrated in FIG. 2) is drawn on the screen. According to embodiments, the bounding box 215 may be an outline of the object and may be an overlay on the object 205. The bounding box 215 may be provided to help the user see the extent of the resize or rotate action he has taken (i.e., the size to which the object 205 will be resized or the angle at which the object will be rotated) before the layout and display are updated. According to an embodiment, the bounding box 215 may be a dotted outline of the object 205. In the example illustrated in FIG. 2, a resize action of clip art (object 205) is launched (104). Although not shown, a mock view is generated (106), the wrapping polygon is calculated (108), and the time to calculate the wrapping polygon is measured (110). In the example illustrated in FIG. 2, the performance of the wrapping polygon calculation exceeds a predetermined threshold (116) and accordingly, the layout and display updates may be aborted (118). For instance, a bounding box 215 may be displayed in place of the object 205 being resized or rotated. The bounding box 215 may grow or shrink in size according to the user's cursor 220 position, multi-touch expansion or touch position. In fallback mode, the object 205 is not redrawn and consequently, the surrounding text 225 is not updated to reflow around the object 205. The bounding box 215 may be displayed around the outline of the object 205 to provide the user with an indication of how far he is dragging the edge of the object 205 and the size of the eventually resized object.

According to embodiments, when a threshold is exceeded and the wrapping polygon calculation is cancelled, catching up may be possible. Referring back to FIG. 1, the method 100 proceeds to DECISION OPERATION 122 where a determination is made whether performance of the redraw action may be able to catch up with the action of the user's cursor/touch point 220, that is, whether the resize or rotate action may be completed without exceeding the predetermined threshold. According to one embodiment, a speed at which the user is moving his input device (e.g., mouse, finger, stylus, etc.) and thus, the speed at which the cursor/touch point 220 is moving, may be measured to determine if the user has slowed movement down enough that performance (redraw) may be able to catch up. According to another embodiment, a distance between the user's cursor/touch point 220 position and the current position of the object 205 may be measured to determine if performance (redraw) may be able to catch up. If at DECISION OPERATION 122 a determination is made that the input device/cursor 220 movement speed or the distance between the user's cursor/touch point 220 position and the current position of the object 205 exceeds a predetermined threshold, the method 100 may return to OPERATION 120 where the bounding box 215 is visible but the layout and display may not be updated to reflect the new size/position of the object 205. If at DECISION OPERATION 122 a determination is made that the input device/cursor 220 movement speed or the distance between the user's cursor/touch point 220 position and the current position of the object 205 is below a predetermined threshold, the method 100 may return to OPERATIONS 110 and 112 where the layout and display are updated.

Figure 3:
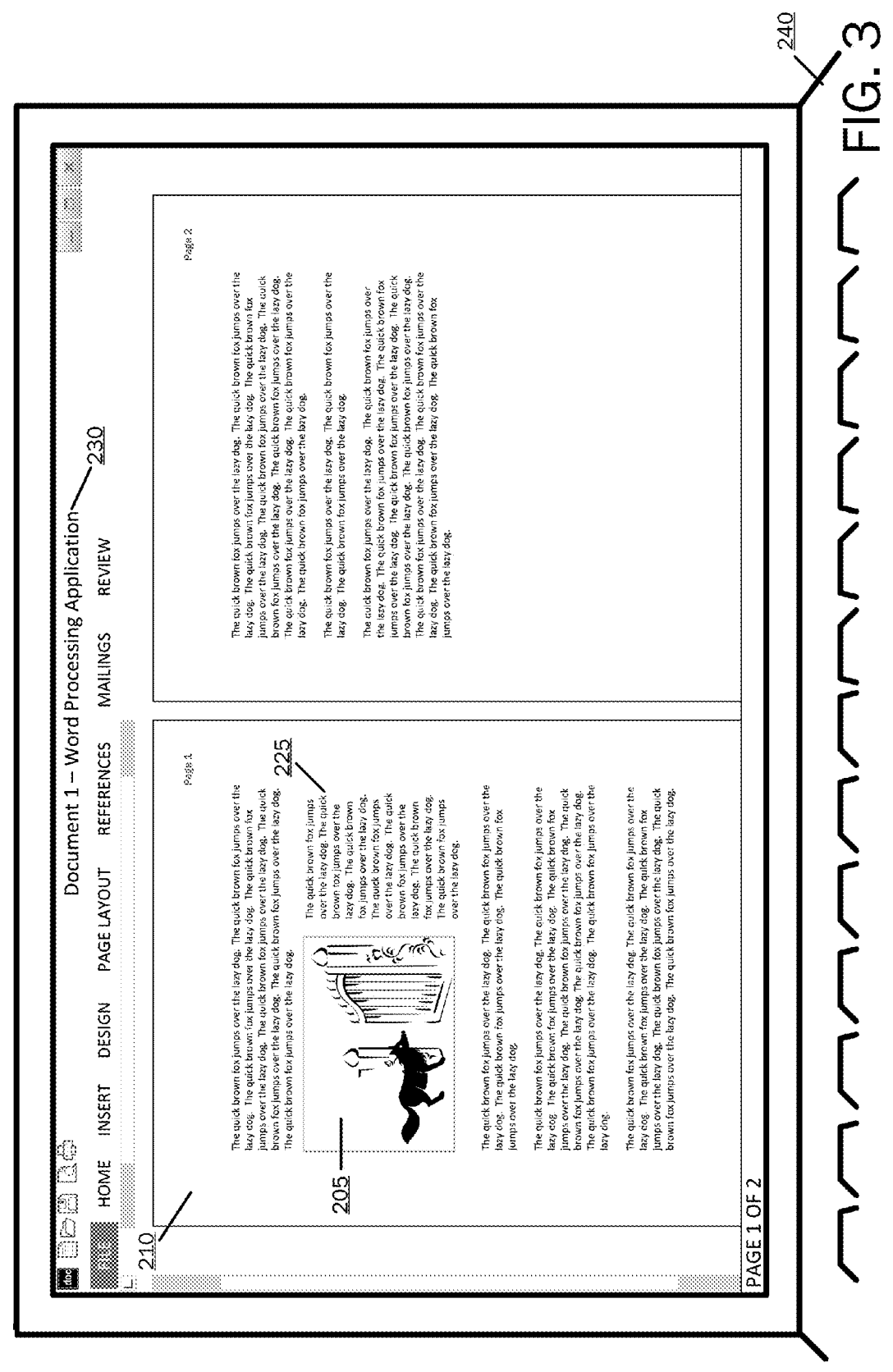

The method 100 proceeds to OPERATION 124 where a drop action is received. The drop action may be a commitment to the resize or rotate action. For example, if a user is utilizing a mouse as an input device, the drop action may be received when the user releases a mouse button. If a user is utilizing a touchscreen, the drop action may be received when the user moves his finger away from the screen. Once a drop action is received, the method 100 repeats OPERATIONS 108-112, where the layout and display are updated to reflect the final size/position of the object 205 as illustrated in FIG. 3. The method 100 ends at OPERATION 195.

Embodiments may also provide for determining when an object 205 may not land at a current position of the cursor/touch point 220 when the object is being moved, resized or rotated. For example, the object may no longer fit on a page it is currently on. With current systems, the object 205 may be moved to a next page in a document 210. The user may not understand where the object 205 landed or why it was moved to another page. According to embodiments, during a move, resize, or rotate action, if an updated layout causes the object 205 to move to a new page, a visualization may be provided to help a user understand what has occurred.

Figure 4:
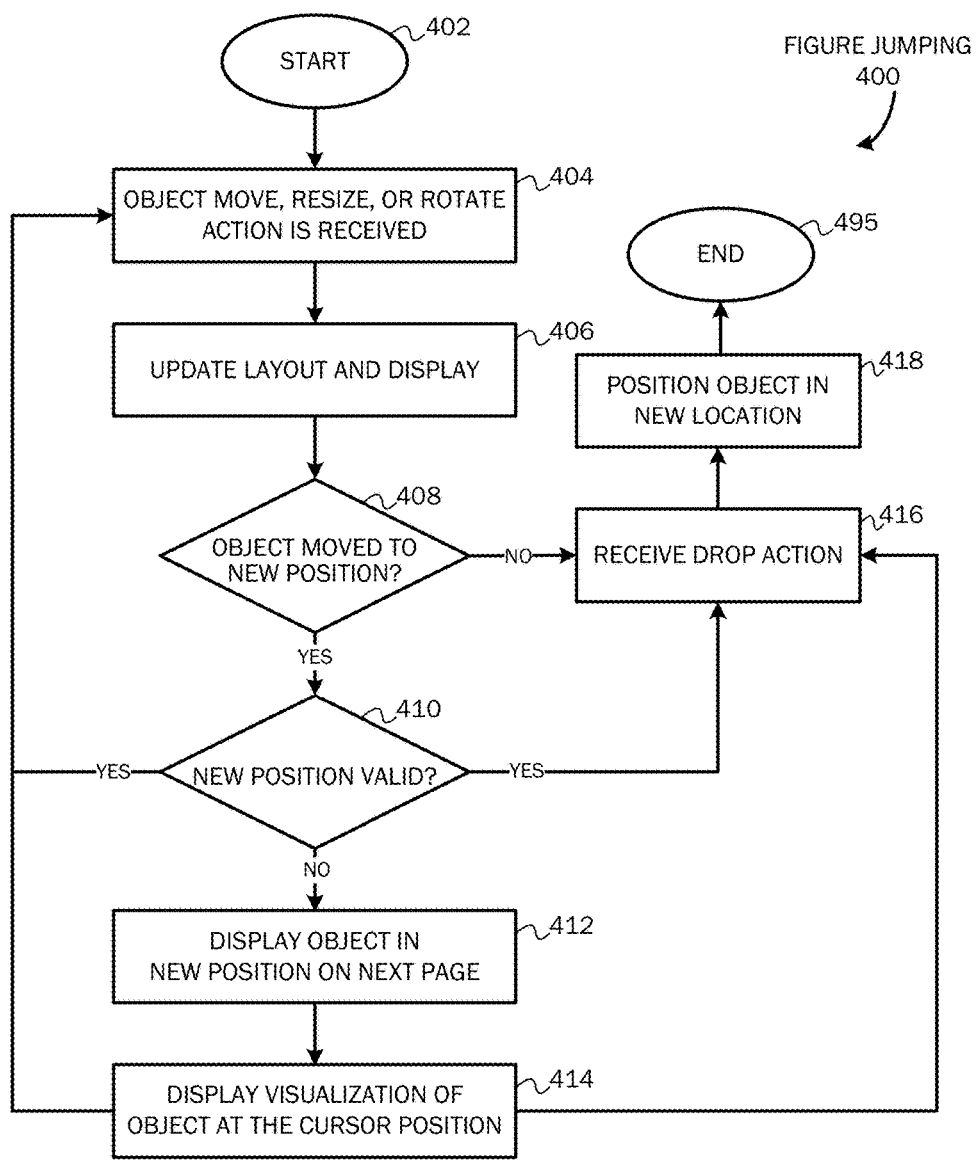
FIG. 4 is a flow chart of a method for providing a visualization indication of an invalid drop location of an object during a move, resize or rotate action.
Figure 5A:
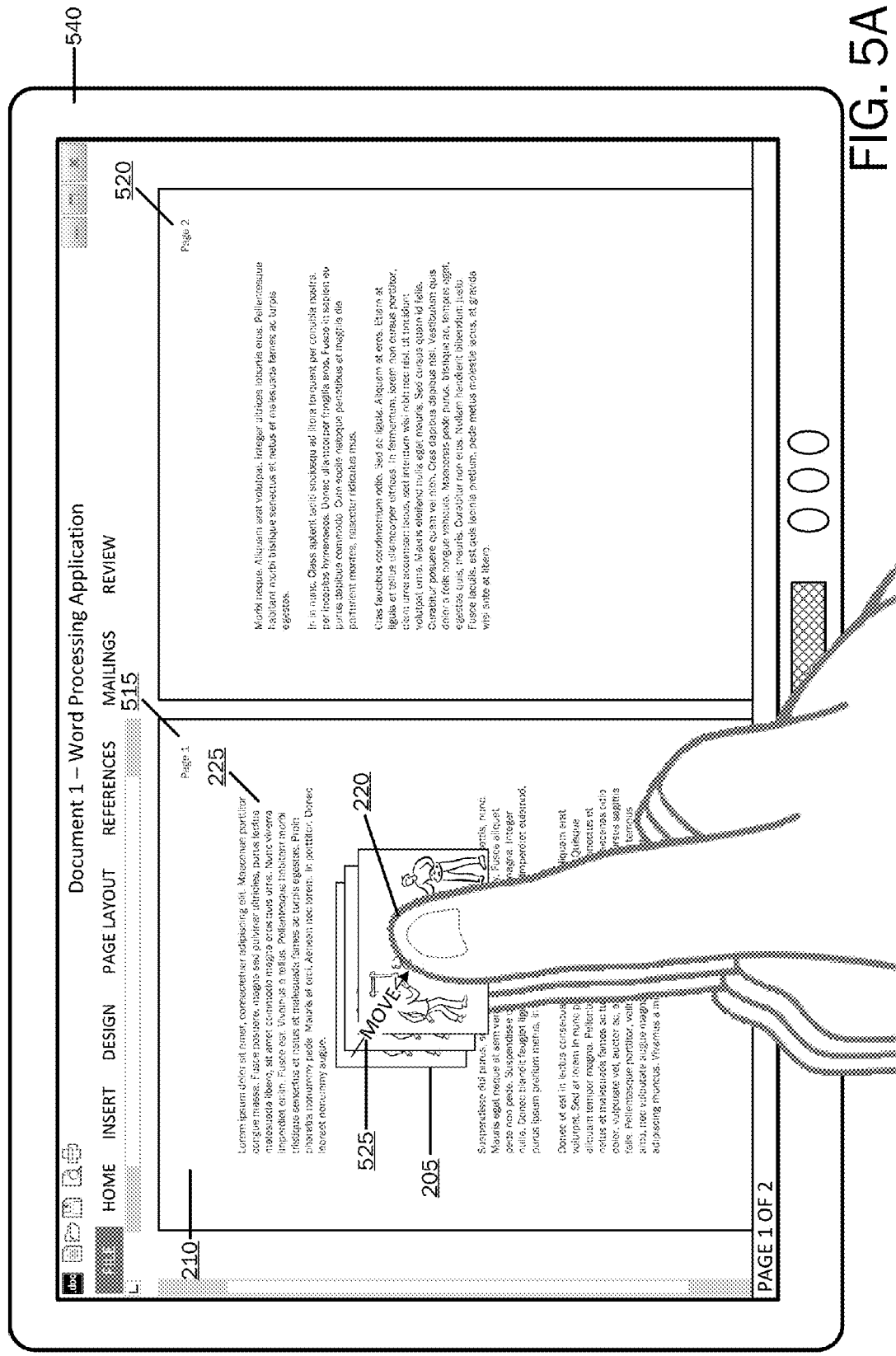
FIGS. 5A-5B are illustrations of example screenshots during a move action of an object to an invalid drop location.
Figure 5B:
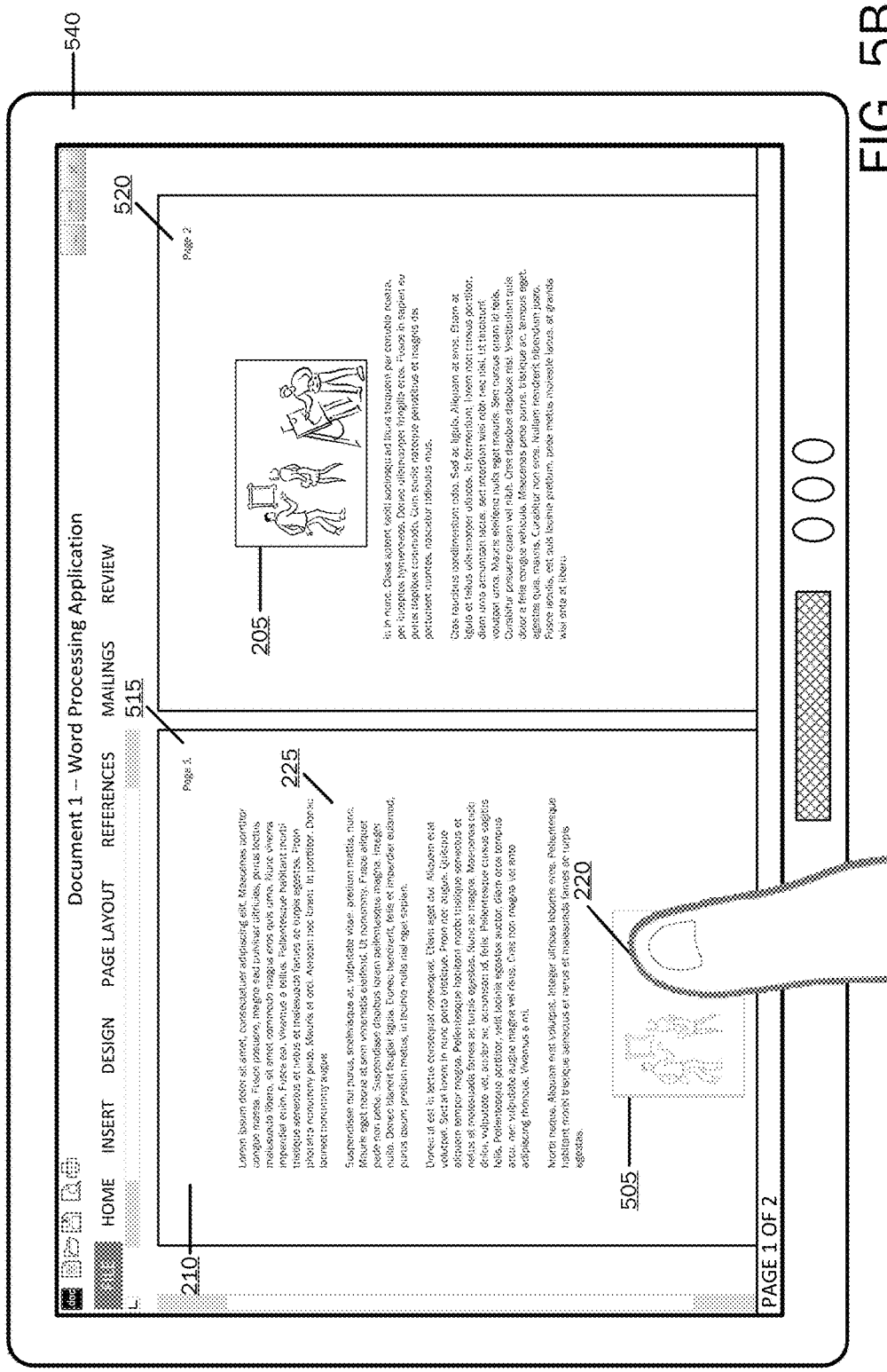

Referring now to FIG. 4, a flow chart of a method 400 for providing a visualization indication of an invalid drop location of an object 205 during a move, resize or rotate action is shown. For purposes of illustration, the process flow of method 400 will be described with reference to FIGS. 5A and 5B. The method 400 starts at OPERATION 402 and proceeds to OPERATION 404 where input associated with a move, resize or rotate action associated with an object 205 is received. A move, resize or rotate action may be initiated via various methods. For example, a user may select on an object 205 via a clicking on the object with an input device such as a mouse. Or, if the user is using a touch interface such as a tablet computing device 540 as illustrated in FIGS. 5A and 5B, the user may touch on an object 205 to select it. In a touch interface scenario, a resize action may be triggered by touching a dragging a resize handle 235, a rotate action may be triggered by touching a dragging a rotate handle, and a move action 525 may be triggered by dragging the object 205 on the touch screen. Although in the example illustrated in FIGS. 5A and 5B the document 210 is shown displayed on a screen of a tablet computing device 540, as should be appreciated, a tablet computing device 540 is just one of various types of computing devices with which embodiments of the present invention may be practiced.

The method 400 proceeds to OPERATION 406 where the layout of the document 210 may be updated. The layout and display of the document 210 may be updated in real time during a move 525, resize, or rotate action of an object 205. For example, text 225 and other content items may be shifted. At DECISION OPERATION 408, a determination may be made whether the object 205 has moved to a new position as a result of the move 525, resize, or rotate action. If a determination is made that the object 205 has moved to a new position, at DECISION OPERATION 410, a determination may be made whether the new position is a valid landing position on the current page 515. That is, a determination is made whether the object 205 no longer fits in the bounds of the current page 515 due to the position/location, size, or angle of the object 205 from the move 525, resize, or rotate action and may be repositioned to the next page 520.

If the new position of the object 205 is valid, the layout and display may continue to update and the method 400 may either repeat back to OPERATION 404 where another move 525, resize or rotate action is received or may proceed to OPERATION 416 where a drop action is received. The drop action may be a commitment to the move 525, resize or rotate action. For example, if a user is utilizing a mouse as an input device, the drop action may be received when the user releases a mouse button. Once a drop action is received, the method 400 may proceed to OPERATION 418 where the object 205 is positioned in its new location.

If at DECISION OPERATION 410 the new position of the object 205 is determined to be invalid for the current page 515, that is, the object 205 no longer fits in the bounds of the current page 515, the method 400 may proceed to OPERATION 412 where the object 205 may be displayed in its new position on the next page 520 as illustrated in FIG. 5B. Additionally, at OPERATION 414, visualization 505 of the object 205 may be displayed at the position of the user's cursor/touch point 220. According to embodiments, the visualization 505 may provide an indication that the object 205 will not land at the current cursor/touch point position 220 when the move 525, resize or rotate action is completed. According to one embodiment, the visualization 505 may be a semi-transparent version of the object 205 (i.e., a ghost object). As the user moves his input device (e.g., mouse, finger, stylus, etc.), the object 205 and the visualization (ghost object) 505 may move in sync. If the position of the cursor/touch point 220 moves far enough up on the page 515 or the object 205 is resized or rotated such that it will fit on the current page 515, the visualization (ghost object) 505 may disappear and the object 205 may be displayed on the current page 515 under the cursor/touch point 220. According to an embodiment, OPERATIONS 412 and 414 may occur simultaneously.

The method may repeat at OPERATION 404 where the object 205 continues to be moved 525, resized rotated, or may proceed to OPERATION 416 where a drop action is received. The drop action may be a commitment to the move 525, resize or rotate action. Once a drop action is received, the method 400 may proceed to OPERATION 418 where the object 205 is positioned in its new location. According to an embodiment, if pages 515,520 of a document 210 are laid out vertically in the display and if a visualization (ghost object) 505 is displayed when a drop action is received, the document 210 may be scrolled to bring the object 205 into view in its new location. The method 400 ends at OPERATION 495.

According to embodiments, live drag functionality may be utilized inside a table and when dragging an object 205 from outside to inside a table. Embodiments may provide for determining when an object that starts outside of a table may be attached inside of a table or when it may move between cells. An object 205 such as a chart, picture, shape, etc. may be anchored to text in a document. An object 205 may be anchored to text outside of a table as well as to text inside a table. Currently, if a user moves an object 205 around on a page and if the page includes a table, the object may jump into the table if the object is moved onto or near the table. If there is not enough space on the page for the table to be displayed with the object inside, the table may be relocated to a next page. As can be appreciated, interaction between objects and tables can be confusing and frustrating of a user as the layout is being constantly updated. Additionally, currently, if an object is inside a table, it may be positioned inside a cell of the table. If the user drags the object downward, the bottom border of the table cell may continue to push down, making it difficul515t to move an object from one cell to another.

Figure 6:
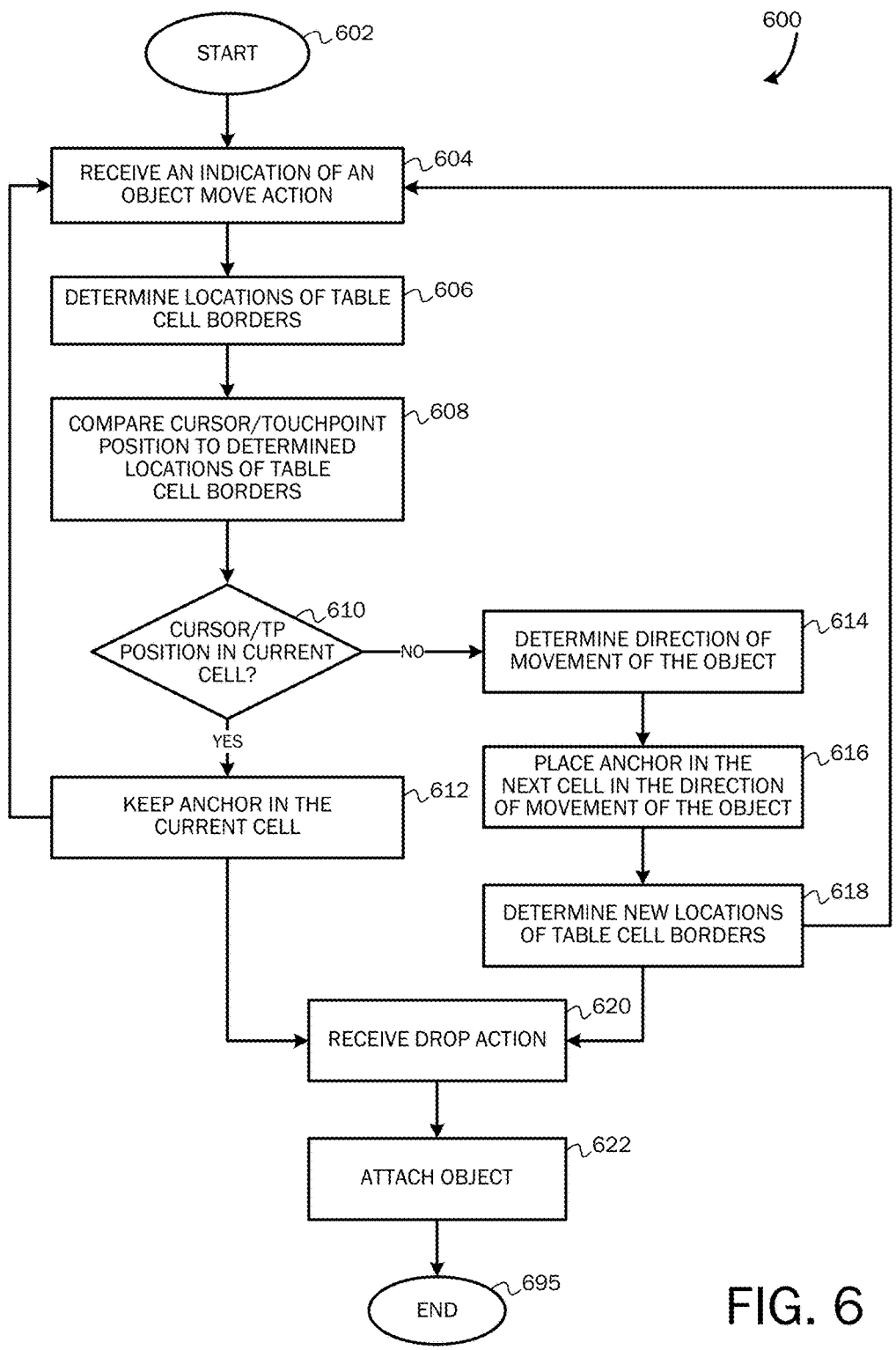
FIG. 6 is a flow chart of a method for determining an attachment point for an object on a page comprising a table.

Embodiments provide for determining an attachment point for an object, for example, whether an object's anchor may be attached inside a table or when an object's anchor may move between cells of a table. FIG. 6 illustrates a flow chart of a method 600 for determining an attachment point. For purposes of illustration, the process flow of method 600 will be described with reference to FIGS. 7A-B and 8. According to embodiments, when a table 705 and an object 205 are located on a page 515 and a move action 525 of the object 205 is received, an attempt to find a position that allows both the table 705 and the object 205 to fit on the same page 515 may be made. In doing so, movement of the object 205 may be evaluated to try to determine if a user's intent is to move the object 205 into the table 705.

Figure 7A:
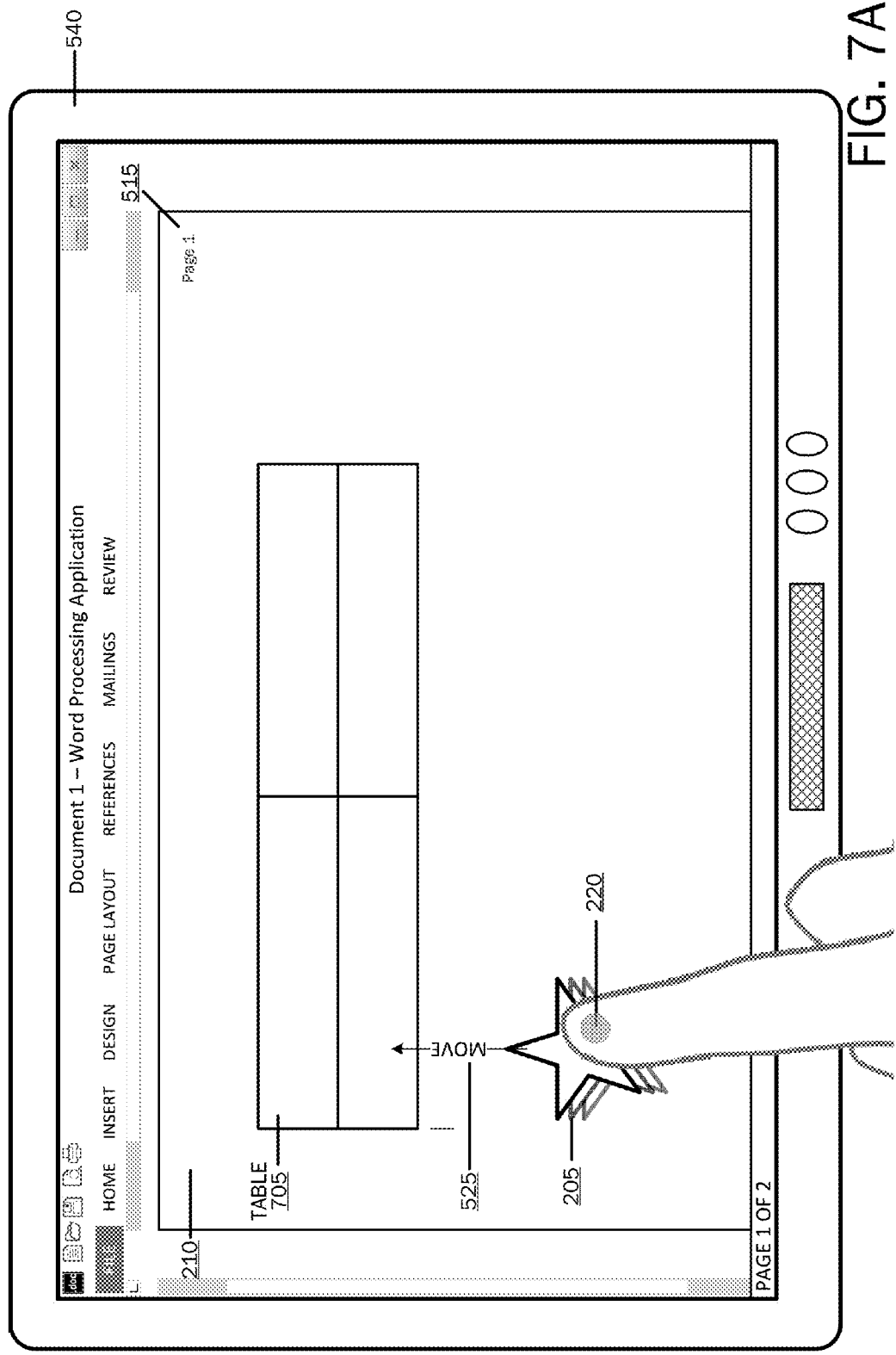
FIG. 7A is an illustration of example screenshot during a move action of an object towards a table.

Referring now to FIG. 6, the method 600 starts at OPERATION 602 and proceeds to OPERATION 604 where input associated with a move action of an object 205 located on a same page 515 as a table 705 is received. For example, as illustrated in FIG. 7A, an object (in this example, a star) 205 is shown located below a table 705. A user's cursor/touch point 220 is located on the object 205, and the user is moving 525 the object 205 upwards towards the table 705.

The method 600 proceeds to OPERATION 606 where locations of the table's 705 cell borders 710 are determined. According to embodiments, a snapshot of the page 515 may be taken to determine the current location of the cells 715A-E and cell borders 710. According to one embodiment, the area on the page 515 outside the table 705 may be considered a single cell 715E.

Figure 7B:
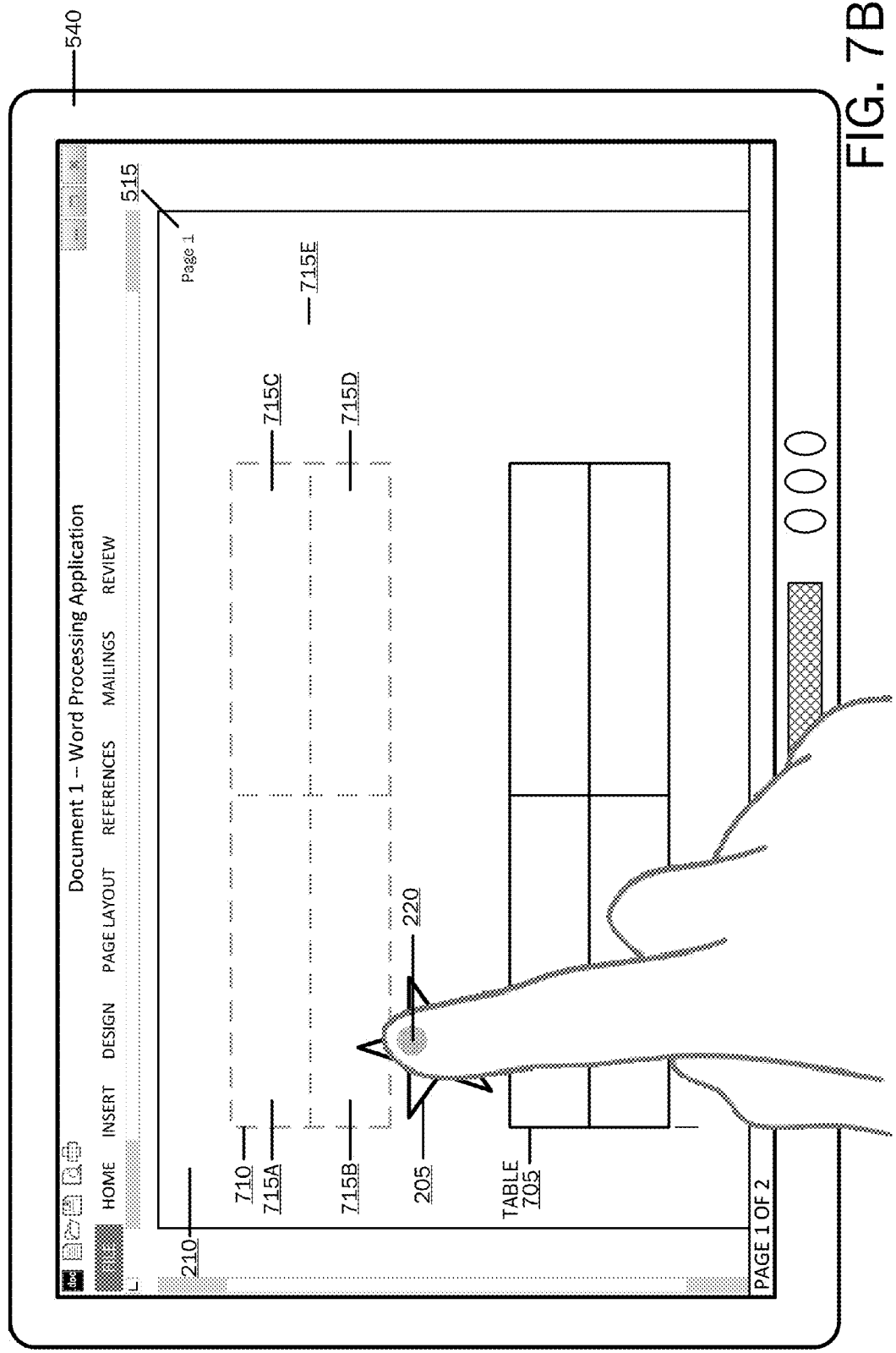
FIG. 7B is an illustration of an example screenshot showing a determination of table cell borders.

During the move action 525, at OPERATION 608 the current cursor/touch point position 220 may be compared with the determined location of the table cell borders 710 as illustrated in FIG. 7B. As shown, as the object 205 is moved, the table's 705 position may be shifted until it is determined that the user's intention is to place the object 205 in the table 705.

At DECISION OPERATION 610, a determination may be made to determine whether the current cursor/touch point position 220 is in the current cell 715E (e.g., in this example, outside the table 705). For example, the determination may be made by determining if the current cursor/touch point position 220 has crossed a cell border 710. If it is determined that the current cursor/touch point position 220 is in the current cell 715E, the method 600 proceeds to OPERATION 612 where the object's anchor may remain in the current cell 715E.

If a determination is made at DECISION OPERATION 610 that the current cursor/touch point position 220 is not located in the current cell 715E, the method proceeds to OPERATION 614 where a direction of movement of the object 205 is determined. According to an embodiment, the direction of movement of the object 205 may be determined by the direction of movement of the user's cursor/touch point 220.

Figure 8:
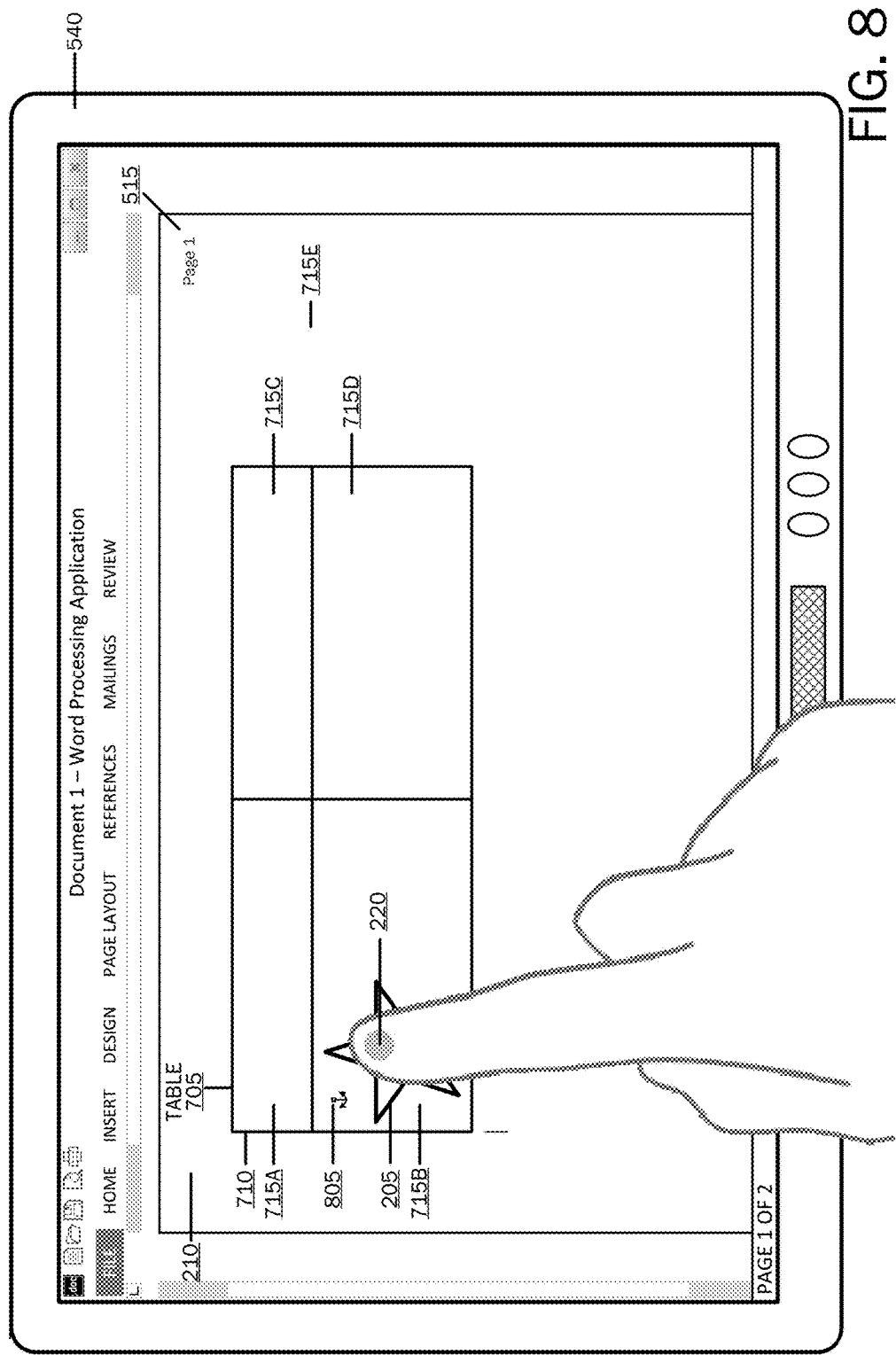
FIG. 8 is an illustration of an example screenshot showing an anchor of an object being moved into a cell in a table.

At OPERATION 616 and as illustrated in FIG. 8, the anchor 805 of the object 205 may move in a next cell 715B in the direction of movement. At OPERATION 618, the new locations of the table 705 cell borders 710 may be determined. According to an embodiment, a snapshot of the page 515 may be taken to determine the current location of the cells 715A-E and cell borders 710.

The method 600 may return to OPERATION 604 if the move action 525 continues or may proceed to OPERATION 620 where a drop action is received. The drop action may be a commitment to the move 525 action. For example, if a user is using a touch screen, the drop action may be received when the user releases his finger from the screen. Once a drop action is received, the method 600 may proceed to OPERATION 622 where the object's anchor 805 is attached. The method ends at OPERATION 695.

Figure 9:
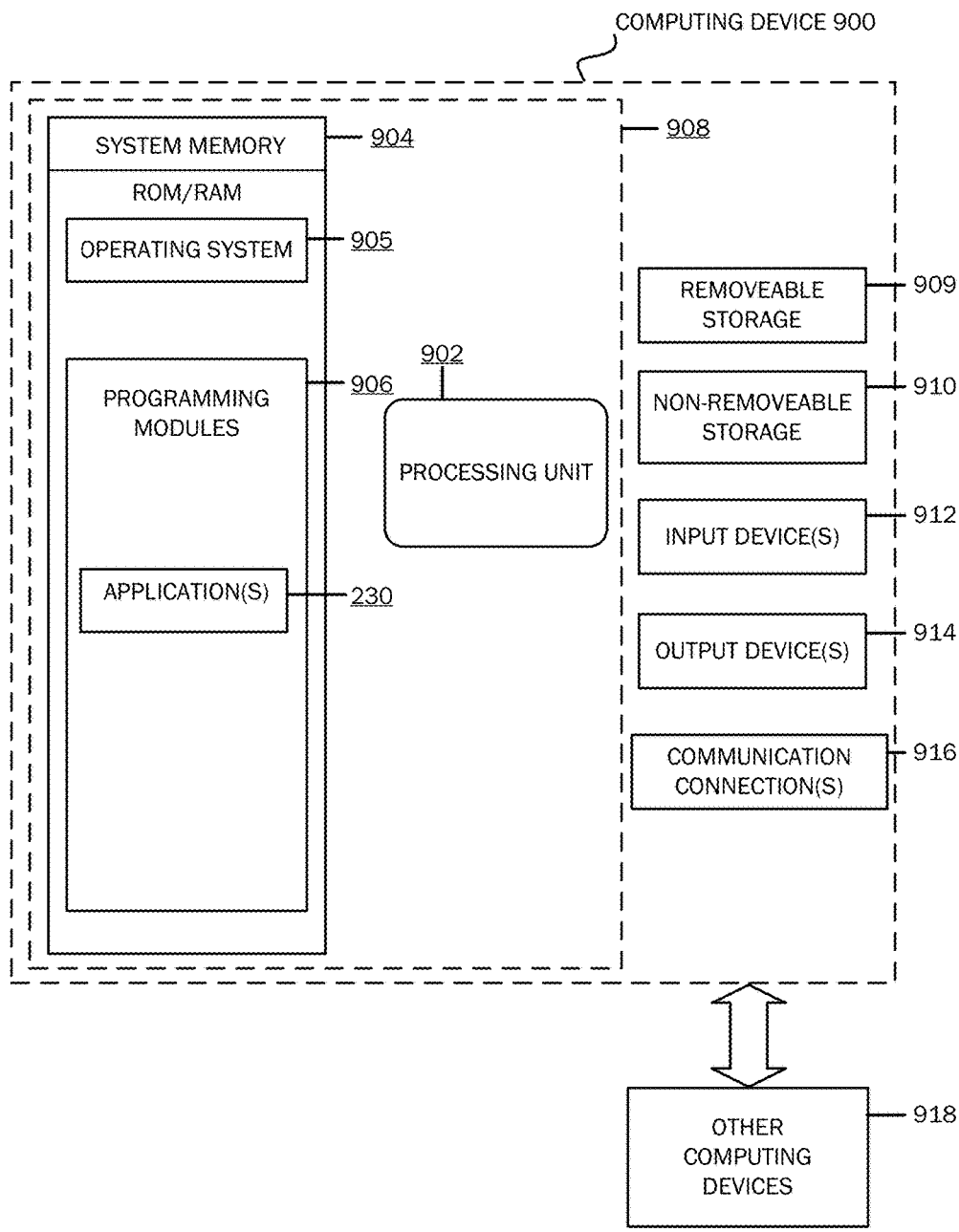
FIG. 9 is a block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, such as tablet computing device 540, notebook computers, and laptop computers 240), hand-held devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 9 through 11 and the associated descriptions provide a discussion of a variety of operating environments in which embodiments of the invention may be practiced. However, the devices and systems illustrated and discussed with respect to FIGS. 9 through 11 are for purposes of example and illustration and are not limiting of a vast number of computing device configurations that may be utilized for practicing embodiments of the invention, described herein.

FIG. 9 is a block diagram illustrating example physical components (i.e., hardware) of a computing device 900 with which embodiments of the invention may be practiced. The computing device components described below may be suitable for the computing devices described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software applications 230, for example, word processing applications, spreadsheet applications, database applications, slide presentation applications, drawing or computer-aided application programs, etc. The operating system 905, for example, may be suitable for controlling the operation of the computing device 900. Furthermore, embodiments of the invention may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 may perform processes including, for example, one or more of the stages of the methods 100,400 and/or 600. The aforementioned process is an example, and the processing unit 902 may perform other processes. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to applications 230 may be operated via application-specific logic integrated with other components of the computing device 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 900 may also have one or more input device(s) 912 such as a keyboard, a mouse, a pen, a sound input device, a touch input device, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 904, the removable storage device 909, and the non-removable storage device 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 900. Any such computer storage media may be part of the computing device 900.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
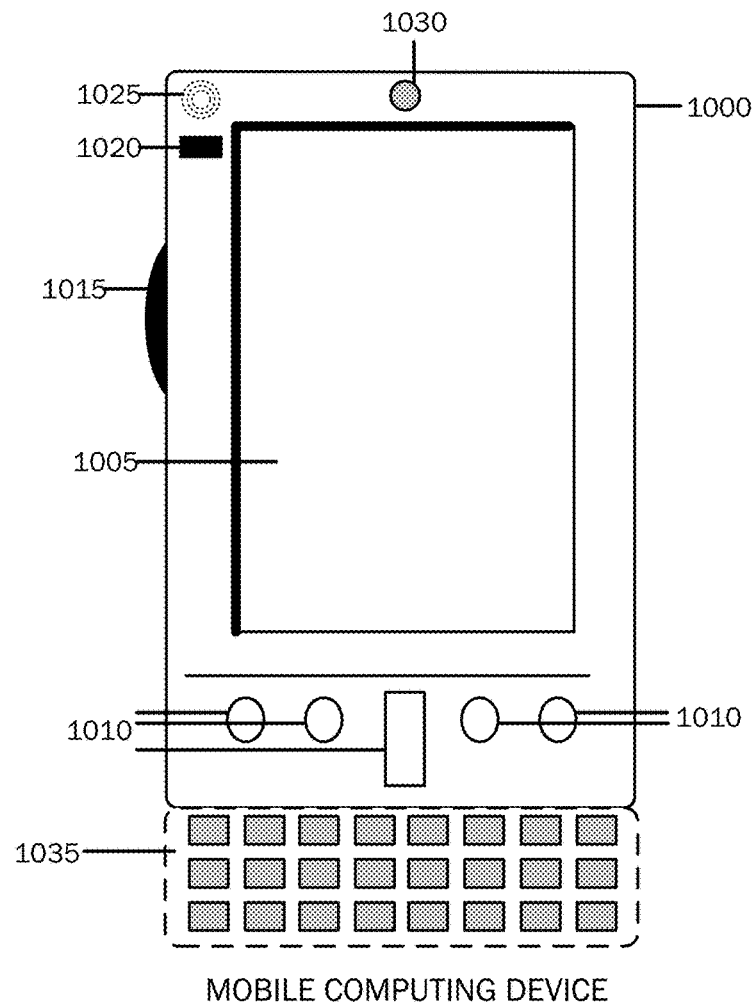
FIGS. 10A and 10B are simplified block diagrams of a mobile computing device with which embodiments of the present invention may be practiced.
Figure 10B:
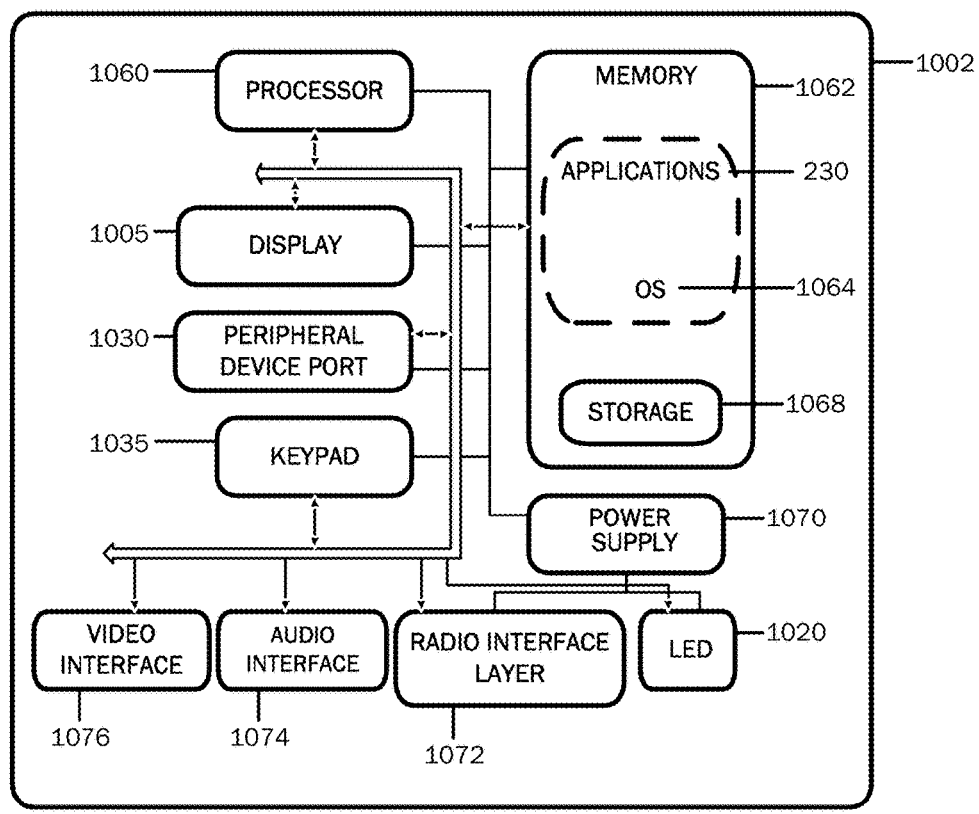
Figure 11:
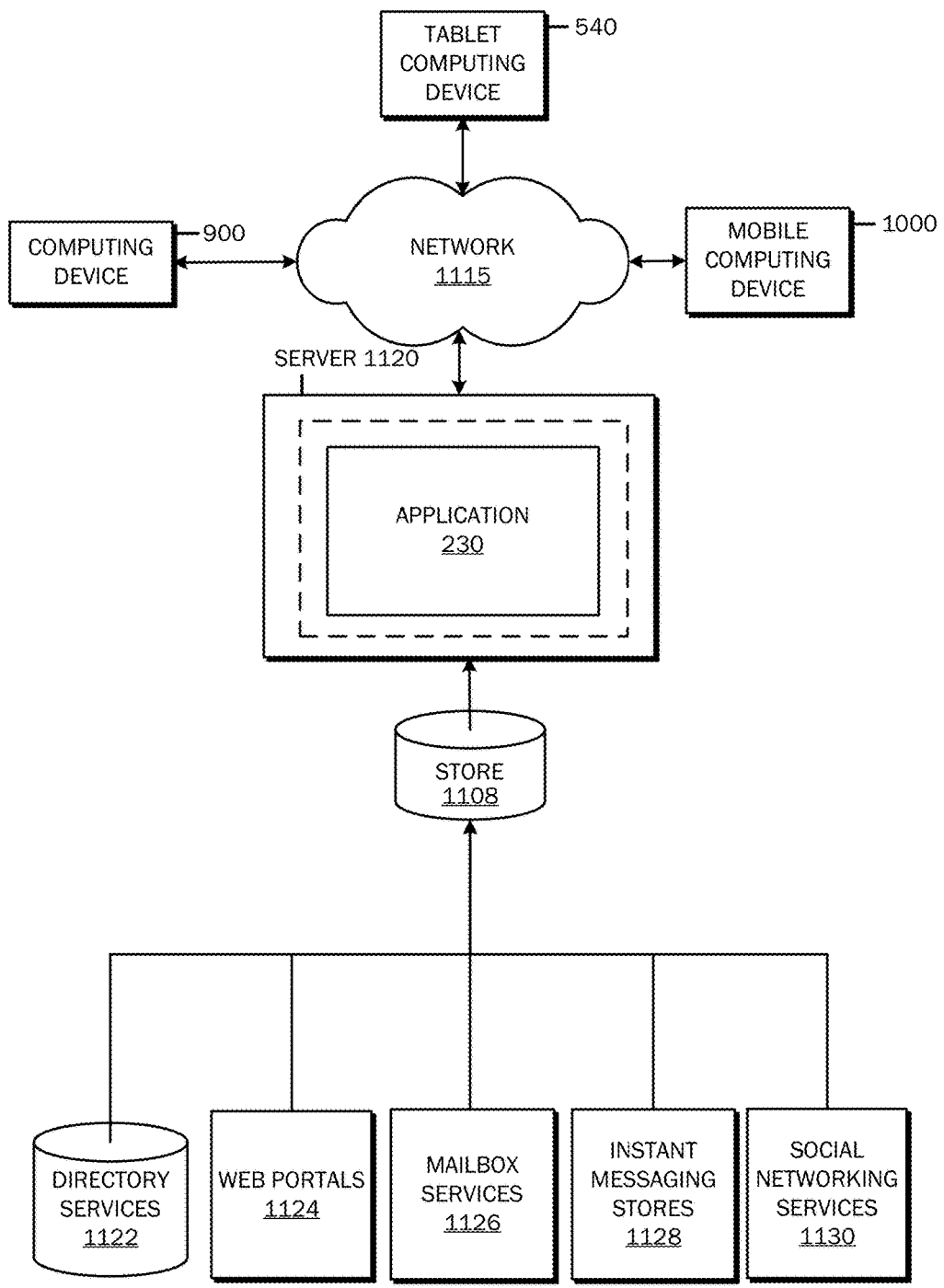
FIG. 11 is a simplified block diagram of a distributed computing system in which embodiments of the present invention may be practiced.

FIGS. 10A and 10B illustrate a mobile computing device 1000, for example, a mobile telephone, a smart phone, a tablet personal computer, such as tablet computing device 540, a laptop computer 240, and the like, with which embodiments of the invention may be practiced. With reference to FIG. 10A, an exemplary mobile computing device 1000 for implementing the embodiments is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative embodiments, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some embodiments, the mobile computing device 1000 incorporates a vibration transducer for providing the user with tactile feedback. In yet another embodiment, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1000 can incorporate a system (i.e., an architecture) 1002 to implement some embodiments. In one embodiment, the system 1002 is implemented as a "smart phone" capable of running one or more applications (e.g., browser, e-mail, calendaring, contact managers, messaging clients, games, and media clients/players). In some embodiments, the system 1002 is integrated as a computing device, such as an integrated personal digital assistant (PDA) and wireless phone.

One or more application programs 230 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 230 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including the applications 230 described herein.

The system 1002 has a power supply 1070, which may be implemented as one or more batteries. The power supply 1070 might further include an external power source, such as an AC adapter or a powered docking cradle that supplements or recharges the batteries. The system 1002 may also include a radio 1072 that performs the function of transmitting and receiving radio frequency communications. The radio 1072 facilitates wireless connectivity between the system 1002 and the "outside world", via a communications carrier or service provider. Transmissions to and from the radio 1072 are conducted under control of the operating system 1064. In other words, communications received by the radio 1072 may be disseminated to the application programs 230 via the operating system 1064, and vice versa.

The radio 1072 allows the system 1002 to communicate with other computing devices, such as over a network. The radio 1072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1002 provides notifications using the visual indicator 1020 that can be used to provide visual notifications and/or an audio interface 1074 producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present invention, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068. Computer storage media may include volatile and nonvolatile, removable and non-removable media implemented in any method or technology for storage of information, such as computer readable instructions, data structures, program modules, or other data.

Data/information generated or captured by the mobile computing device 1000 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

FIG. 11 illustrates one embodiment of the architecture of a system for providing applications 230 to one or more client devices, as described above. Content developed, interacted with or edited in association with the applications 230 may be stored in different communication channels or other storage types. For example, various documents may be stored using a directory service 1122, a web portal 1124, a mailbox service 1126, an instant messaging store 1128, or a social networking site 1130. The applications 230 may use any of these types of systems or the like for providing real-time feedback as a move, resize, or rotate action is being performed as described herein. A server 1120 may provide the applications 230 to clients. As one example, the server 1120 may be a web server providing the applications 230 over the web. The server 1120 may provide the applications 230 over the web to clients through a network 1115. By way of example, the client computing device may embodied in a computer 900, a tablet computing device 540 and/or a mobile computing device 1000 (e.g., a smart phone). Any of these embodiments of the client computing device may obtain content from the store 1108. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method for providing a visualization indication of an invalid drop location of an object during a move, resize or rotate action, the method comprising:
   receiving an input associated with moving, resizing or rotating an object on a page;
   receiving an indication to update a location, size or angle of the object and a layout of the page in real time;

determining if the updated location, size or angle of the object causes the object to be repositioned onto a next page; and if the updated location, size or angle of the object causes the object to be repositioned onto the next page, displaying a visualization of the object repositioned on the next page without committing the object to the updated location, size or angle.

2. The method of claim 1, wherein displaying a visualization of the object on the current page includes displaying a visualization of the object at a position of a mouse cursor or a touch point.

3. The method of claim 1, further comprising:
receiving further input associated with moving, resizing or rotating the object;
updating the location, size or angle of the object and a layout of the page in real time;
determining if the updated location, size or angle of the object causes the object to be repositioned back onto the current page;
if the object is repositioned back onto the current page, removing the visualization of the object.

4. The method of claim 1, wherein displaying a visualization of the object includes displaying a semi-transparent version of the object.

5. The method of claim 1, wherein displaying a visualization of the object includes updating the object and the visualization of the object as input is received.

6. The method of claim 5 wherein updating the object and the visualization of the object includes updating the location, size, or angle of the object and the visualization of the object.

7. A method for providing dynamic interaction between an object and a table, the method comprising:
receiving an input associated with moving an object on a page comprising a table;
determining locations of table cell borders;
determining a current cursor/touch point position;
determining if the current cursor/touch point position is in a current cell;
when the current cursor/touch point position is not in the current cell:
determining a direction of movement of the object;
placing an anchor of the object in a next cell in the direction of movement of the object; and
displaying a visualization of the object in the next cell without committing the object to the next cell.

8. The method of claim 7, further comprising receiving a drop action and attaching the object to the anchor.

9. The method of claim 7, wherein when the current cursor/touch point position is not in the current cell, keeping the anchor of the object in the current cell.

10. The method of claim 7, wherein determining locations of table cell borders includes taking a snapshot of the page.

11. The method of claim 10, wherein an area on the page outside the table is one cell.

12. A computing device for providing a visualization indication of an invalid drop location of an object during a move, resize or rotate action, comprising:
a processing unit; and
a memory including instructions, when executed by the processing unit cause the computing device to:
receive an input associated with moving, resizing or rotating an object on a page;
receive an indication to update a location, size or angle of the object and a layout of the page in real time;
determine if the updated location, size or angle of the object causes the object to be repositioned onto a next page; and
if the updated location, size or angle of the object causes the object to be repositioned onto the next page, display a visualization of the object repositioned on the next page without committing the object to the updated location, size or angle.

13. The computing device of claim 12, wherein to display a visualization of the object on the current page includes to display a visualization of the object at a position of a mouse cursor or a touch point.

14. The computing device of claim 12, further comprising to:
receive further input associated with moving, resizing or rotating the object;
update the location, size or angle of the object and a layout of the page in real time;
determine if the updated location, size or angle of the object causes the object to be repositioned back onto the current page;
if the object is repositioned back onto the current page, remove the visualization of the object.

15. The computing device of claim 12, wherein to display a visualization of the object includes to display a semi-transparent version of the object.

16. The computing device of claim 12, wherein to display a visualization of the object includes to update the object and the visualization of the object as input is received.

17. The computing device of claim 16, wherein to update the object and the visualization of the object includes to update the location, size, or angle of the object and the visualization of the object.

18. The method of claim 7, further comprising:
receiving a commitment of the updated location, size or angle of the object; and
updating the next page to reflect the updated location, size or angle of the object.

19. The computing device of claim 12, further comprising to:
receiving a commitment of the updated location, size or angle of the object; and
updating the next page to reflect the updated location, size or angle of the object.

* * * * *